Nov. 18, 1924.

F. C. BURKHARDT

AXLE HOUSING

Filed Oct. 13, 1922

1,516,148

3 Sheets-Sheet 1

Inventor:
Frederick C. Burkhardt
by Geyer & Popp
Attorneys.

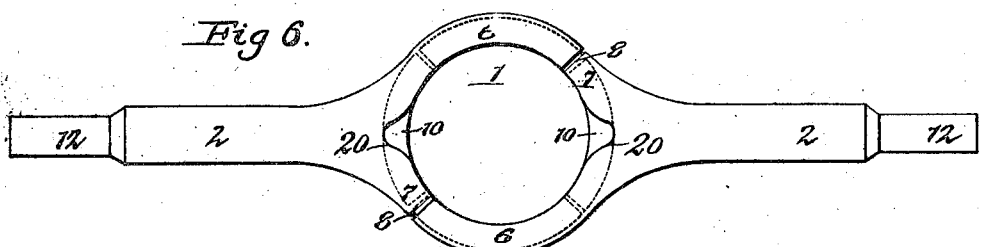
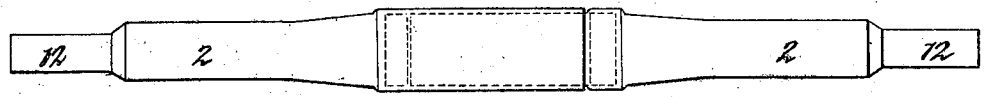
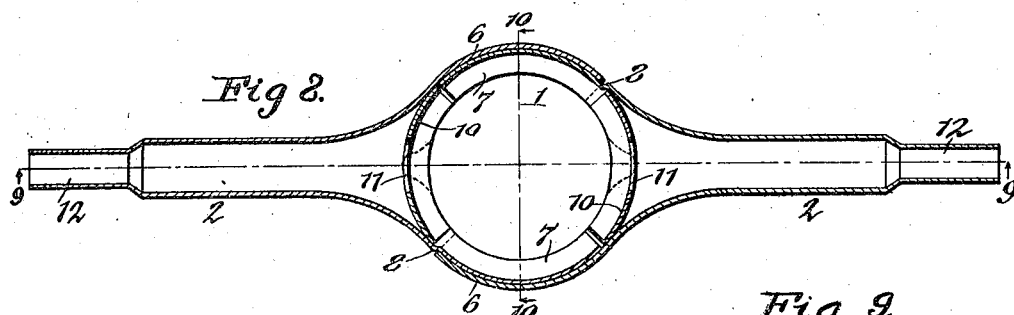
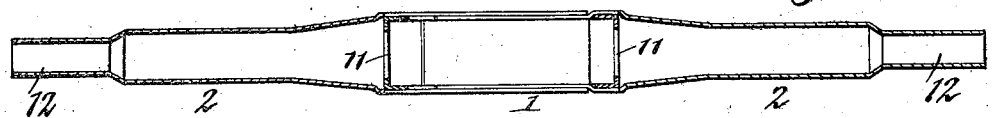
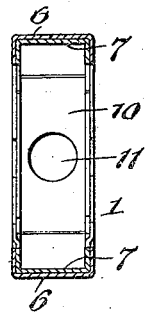
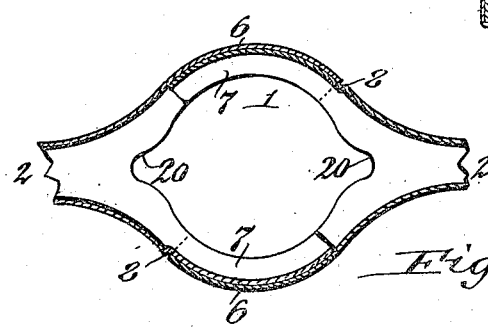

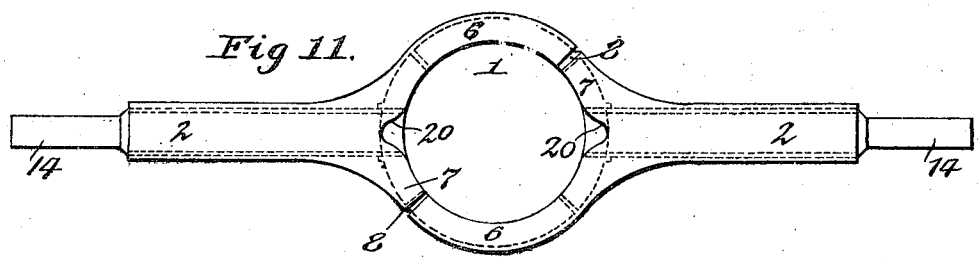
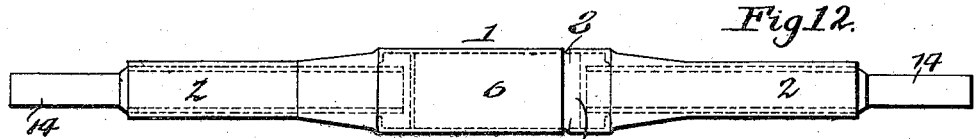
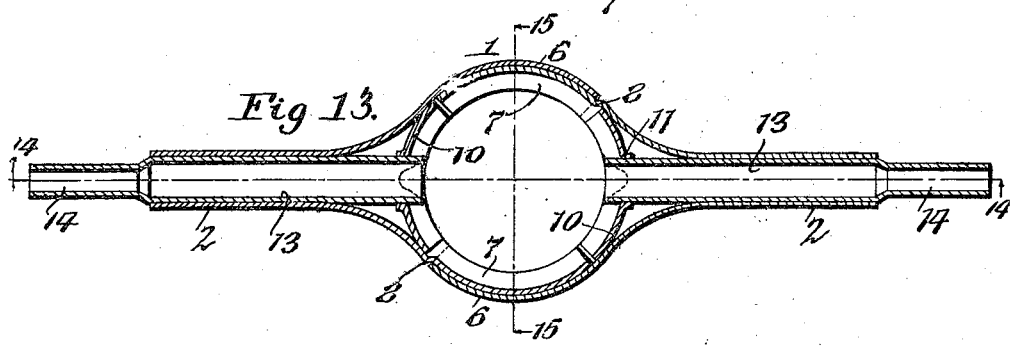
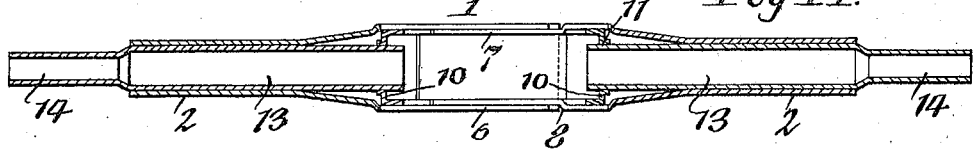
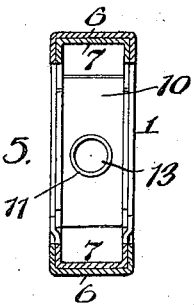

Patented Nov. 18, 1924.                                                         1,516,148

UNITED STATES PATENT OFFICE.

FREDERICK C. BURKHARDT, OF BUFFALO, NEW YORK, ASSIGNOR TO THE CROSBY COMPANY, OF BUFFALO, NEW YORK, A CORPORATION OF NEW YORK.

AXLE HOUSING.

Application filed October 16, 1922. Serial No. 594,984.

*To all whom it may concern:*

Be it known that I, FREDERICK C. BURKHARDT, a citizen of the United States, residing in Buffalo, in the county of Erie and State of New York, have invented new and useful Improvements in Axle Housings, of which the following is a specification.

This invention relates to a housing for the rear axles and associated gearing of automobiles and has the object to produce a housing for this purpose which is very strong and durable and capable of being made easily and at comparatively low cost.

Figure 1:
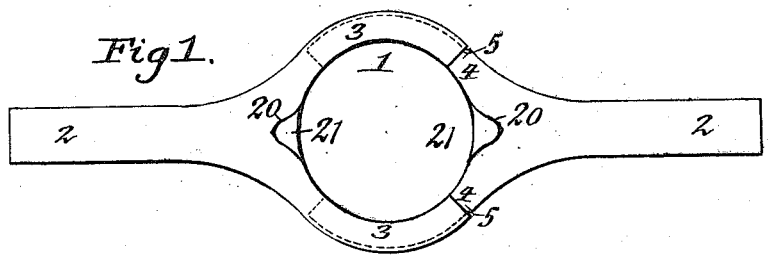
Figure 2:
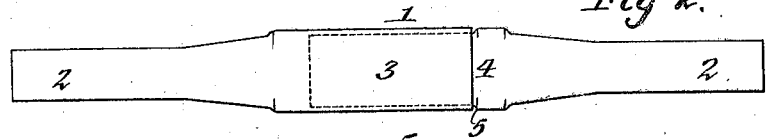
Figure 3:
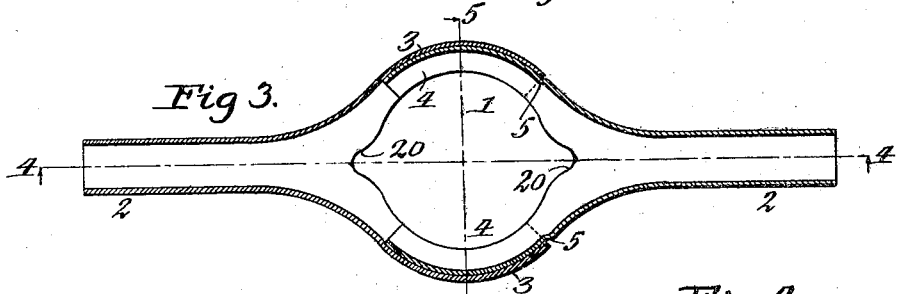
Figure 4:
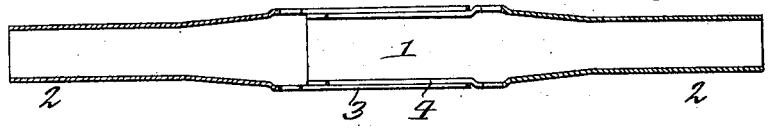
Figure 5:
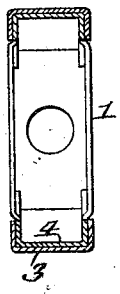

In the accompanying drawings: Figure 1 is a side elevation of an axle housing embodying one form of my invention. Figure 2 is a plan view of the same. Figure 3 is a vertical longitudinal section of the same. Figure 4 is a horizontal longitudinal section of the same, taken on line 4—4, Fig. 3. Figure 5 is a vertical transverse section taken on line 5—5, Fig. 3. Figure 6 is a side elevation of another form of my improvements. Figure 7 is a top plan view thereof. Figure 8 is a vertical longitudinal section of the same. Figure 9 is a horizontal longitudinal section of the same taken on line 9—9, Fig. 8. Figure 10 is a vertical cross section taken on line 10—10, Fig. 8. Figure 11 is a side elevation showing another form of my invention. Figure 12 is a plan view of the same. Figure 13 is a vertical longitudinal section of the same. Figure 14 is a horizontal longitudinal section taken on line 14—14, Fig. 13. Figure 15 is a vertical transverse section taken on line 15—15, Fig. 13. Figure 16 is a fragmentary side elevation showing a still further modification of an axle housing embracing my improvements.

Similar characters of reference refer to like parts throughout the several views.

In its general organization the axle housing which is constructed in accordance with my invention comprises a central gear casing or body 1 which receives the gearing whereby motion is transmitted from the driving shaft to the axle, and two hollow or tubular arms which project laterally from opposite sides of the body and receive the sections of the axle.

The axle housing containing my invention may be variously organized but as shown in Figs. 1–5, the same consists of two sections, each of which comprises an outer tubular part 2 forming an axle arm and a forked inner part, the branches 3, or 4, are spread and are adapted to be assembled with the fork branches of the companion housing section so as to form a gear case therewith. The branches of the forked inner part of the housing section are preferably curved concentrically and about an axis intersecting the axis of the tubular outer arm at right angles to the latter, and each of these branches is also preferably of channel shape in cross section with the concave side of the same turned inwardly. Each of these housing sections may be constructed in any suitable manner, for instance, by splitting lengthwise the inner end of a tubular metal blank which has been drawn seamless and suitably expanding or spreading and shaping the resulting branches to form a fork by means of tools or dies leaving the outer part of this blank in tubular form to receive a section of the axle.

The two sections of the axle housing may be assembled in various ways for instance, the branches of the fork of one section may be telescoped into engagement with the inner sides of the branches of the fork of the other section, before these branches are completely formed after which the formation of the same into channel-shape may be completed by suitable tools so as to interlock the same and cause the two forks to form a complete gear casing for the housing. The overlapping parts of the forks may be pressed together by hand work or machine power so that they are firmly interlocked and produce a gear casing which has a double thickness of metal on its upper and lower sides and thus produces a very strong, stiff and durable construction. In addition to this these forks may be connected with each other by welding, riveting, bolting or otherwise for the purpose of rendering the same oil tight.

In order to produce a flush joint between the branches of the two forks the inner parts of the branches of one fork, for instance those of the right hand fork in Figs. 1-4, may be offset inwardly, as shown at 5, thereby enabling the outer parts of these branches to be arranged flush with the inner parts of the branches of the other section and thus produce a neat and finished appearance.

If desired, the two sections of the axle housing may be of like construction and provided on the inner end of its tubular arm 2 with a form one branch 6 of which is unprovided with an offset while the other branch 7 is provided with an offset, as shown at 8. In such a construction the sections may be made complete and assembled with each other without requiring any subsequent bending or forming operations for interlocking the parts.

In order to strengthen the gear casing a reinforcing lining 10 may be arranged on the inner side of the fork branches of each section and extended across the inner end of the respective tubular arm, this lining being preferably curved and of channel shape in cross section to conform to the shape of the branches to which latter this lining may be secured by brazing, welding or other approved manner. These reinforcing linings are provided on their central parts with openings 11 for the passage of the axle sections. If desired the outer extremities of the axle arms may be reduced in diameter, as shown at 12 in Figs. 6-9, by swaging or otherwise to suit the size of the axle or meet other conditions.

For the purpose of still further increasing the strength of the housing a tubular reinforcement 13 may be arranged in the arm of each housing section with the inner end of this tubular reinforcement projecting through an opening 11 in the adjacent reinforcing lining, as shown in Figs. 11-15. By thus employing the channel-shaped reinforcing linings and tubes a trussing effect is obtained which materially strengthens the axle housing. These views also show another modification of my invention by reducing the outer end of the tubular reinforcement, as shown at 14, instead of reducing the outer ends of the housing arms.

By adding the channel reinforcing lining a double thickness of metal is produced around the side openings of the gear case for drilling and tapping holes to receive the bolts whereby the differential gear carrier and housing cover are held in place.

When spreading a tube section to form an outer tubular arm and two inner branches, notches 20 are formed at the junction between said arm and branches.

In order to produce a finished appearance of the axle housing from the exterior these notches may be closed by filling pieces 21 so as to form continuous circular edges on the arm and branches, as shown for example in Fig. 1, which filling pieces may be secured in place by welding, brazing or any other suitable manner.

These several forms of my invention permit of producing axle housings for use in automobiles of different tonnage economically and of greater strength and durability than those heretofore in use for a given amount of metal in the same.

I claim as my invention:

1. An axle housing comprising two sections each of which has a tubular outer arm and a forked inner part the branches of which are adapted to co-operate with the correspondingly shaped inner part of the companion section to form a gear case and the forked ends of the two sections having a lap fit with each other.

2. An axle housing comprising two sections each of which has a tubular outer arm and a fork-shaped inner part, the branches of said forked part being channel-shaped and adapted to fit the correspondingly shaped members of the companion section and the forked ends of the two sections having a lap fit with each other.

3. An axle housing comprising two sections each of which has a tubular outer arm and a fork-shaped inner part, the branches of said forked part being channel-shaped in cross section and curved about an axis at right angles to the axis of said tubular arm and adapted to fit the correspondingly shaped members of the companion section and the forked ends of the two sections having a lap fit with each other.

4. An axle housing comprising two sections each of which has a tubular outer arm and a fork-shaped inner part, the branches of said forked part being channel-shaped in cross section and curved about an axis at right angles to the axis of said tubular arm and adapted to fit the correspondingly shaped members of the companion section, the forked ends of said sections having a lap fit with each other and a flush joint being produced between a branch of each section and the companion branch of the other section by off-setting one of these branches relatively to the other.

5. An axle housing comprising two sections each of which has a tubular outer arm and a fork-shaped inner part, the branches of said forked part being channel-shaped and adapted to fit the correspondingly shaped members of the companion section, and a channel-shaped reinforcement fitting said channel-shaped branches and extending across the inner end of the arm of the respective section and the forked ends of the two sections having a lap fit with each other.

6. An axle housing comprising two sections each of which has a tubular outer arm and a fork-shaped inner part, the branches of said forked part being channel-shaped in cross section and curved about an axis at right angles to the axis of said tubular arm, and a curved channel-shaped reinforcement arranged on the inner side of the branches of each section and extending across the inner end of the respective arm and the forked ends of the two sections having a lap fit with each other.

FREDERICK C. BURKHARDT.